United States Patent [19]
Stoneburner

[11] 3,744,839
[45] July 10, 1973

[54] INGOT CARRYING VEHICLE
[76] Inventor: Jerry L. Stoneburner, P.O. Box 277, North Jackson, Ohio 44451
[22] Filed: Oct. 21, 1971
[21] Appl. No.: 191,379

[52] U.S. Cl. .............. 296/1 R, 105/377, 296/28 M
[51] Int. Cl. ............................................. B60p 7/02
[58] Field of Search ................ 296/1 R, 28 M, 100; 105/377, 367

[56] References Cited
UNITED STATES PATENTS

| 3,307,495 | 3/1967 | Chapman et al. | 105/377 X |
| 1,258,576 | 3/1918 | Kahn | 105/377 |
| 3,540,771 | 11/1970 | Stoneburner | 296/1 R |
| 3,009,426 | 11/1961 | Nampa | 105/377 X |
| 822,262 | 6/1906 | Engh | 296/100 UX |
| 3,503,341 | 3/1970 | Widell et al. | 105/377 |
| 3,540,171 | 11/1970 | Kumnick et al. | 105/377 X |

Primary Examiner—Benjamin Hersh
Assistant Examiner—John A. Pekar
Attorney—Webster B. Harpman

[57] ABSTRACT

An ingot carrying vehicle particularly adapted for transporting hot metal ingots including a plurality of ingot receiving cradles, an insulated deck beneath said cradles and a pair of oppositely disposed sidewardly movable insulated cover sections hinged to said deck and ends for completely enclosing said ingots whereby said ingots may be shipped without critical temperature loss.

7 Claims, 3 Drawing Figures

PATENTED JUL 10 1973　　　　　　　　　3,744,839

INVENTOR.
JERRY L. STONEBURNER
BY
ATTORNEY

INGOT CARRYING VEHICLE

BACKGROUND OF THE INVENTION

1. Field of the Invention

This invention relates to trucks and trailers and more particularly to insulated trailer constructions having insulated closure means and adapted to handle hot metal ingots.

2. Description of the Prior Art

The known prior art comprises applicant's U.S. Pat. No. 3,540,771 of Nov. 17, 1970, which discloses an insulated trailer construction wherein a plurality of telescopically slidable insulated cover sections are utilized. No other prior art known can be used for hauling red-hot metal ingots. This invention permits the more rapid loading and unloading of an ingot carrying vehicle by providing improved insulated closures, movable sidewardly of the vehicle in hinged relation thereto, to completely expose the ingot carrying area of the vehicle.

SUMMARY OF THE INVENTION

An insulated vehicle and specifically a truck trailer having an insulated deck and a plurality of ingot holding cradles thereon arranged for minimum contact with the ingots has one or more pairs of oppositely disposed sidewardly movable insulated closures hinged to said deck so that the same can be completely opened while the red-hot ingots are loaded on the trailer and removed therefrom and so that upon closing the same they completely enclose the ingots while the same are being transported by the trailer vehicle.

DESCRIPTION OF THE PREFERRED EMBODIMENT

Figure 1:
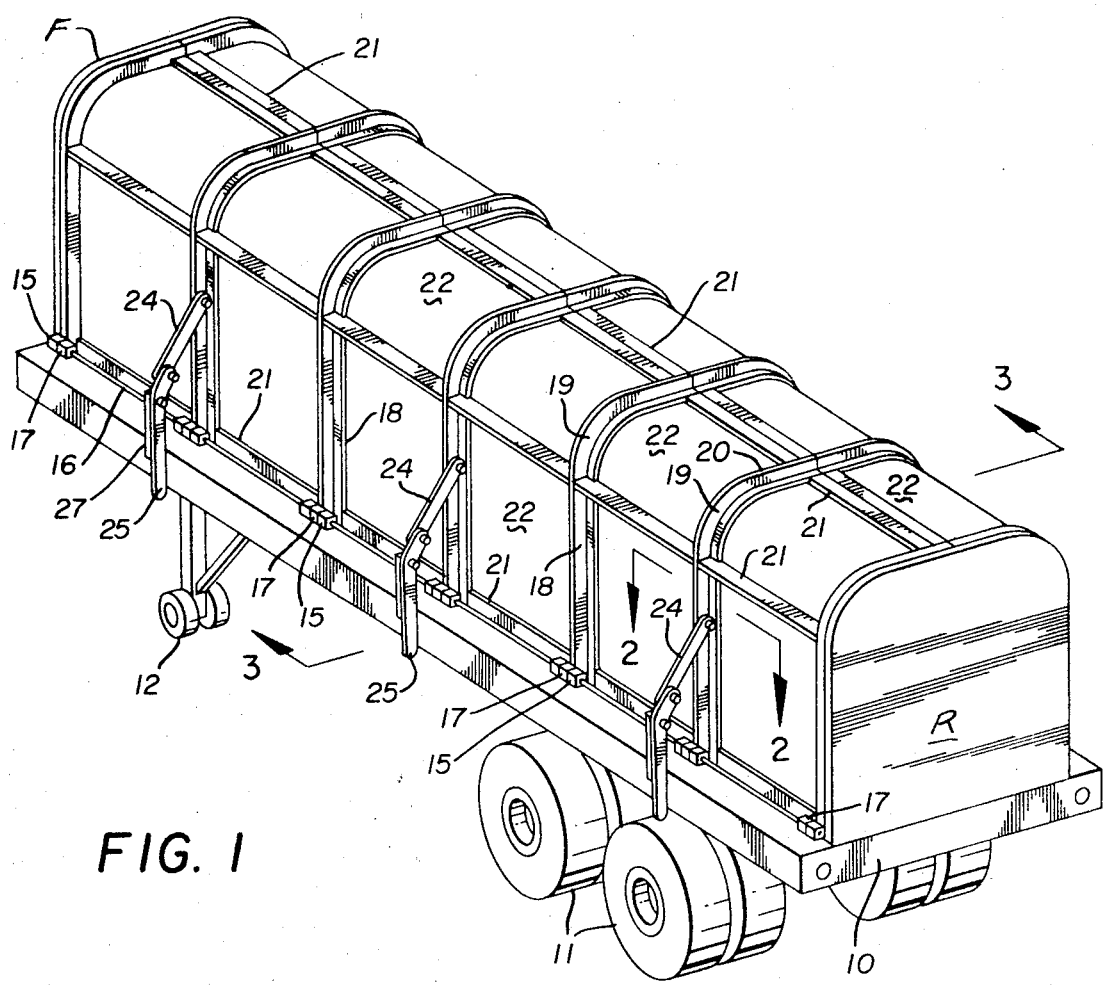
FIG. 1 is a prospective view of a trailer showing the insulated cover sections in closed position.

By referring to the drawings and FIG. 1 in particular it will be seen that the ingot carrying vehicle disclosed herein takes the form of an over-the-road trailer having a deck 10 and ground engaging wheels 11. The wheels 11 are engaged on axle structures which are arranged in tandem beneath the trailer deck 10 as will be understood by those skilled in the art.

The forward end of the trailer is shown supported on a temporary dolly 12, which is foldable upwardly into retracted position when the trailer is positioned partially on a truck or tractor so as to be towed thereby as will occur to those skilled in the art.

Figure 3:
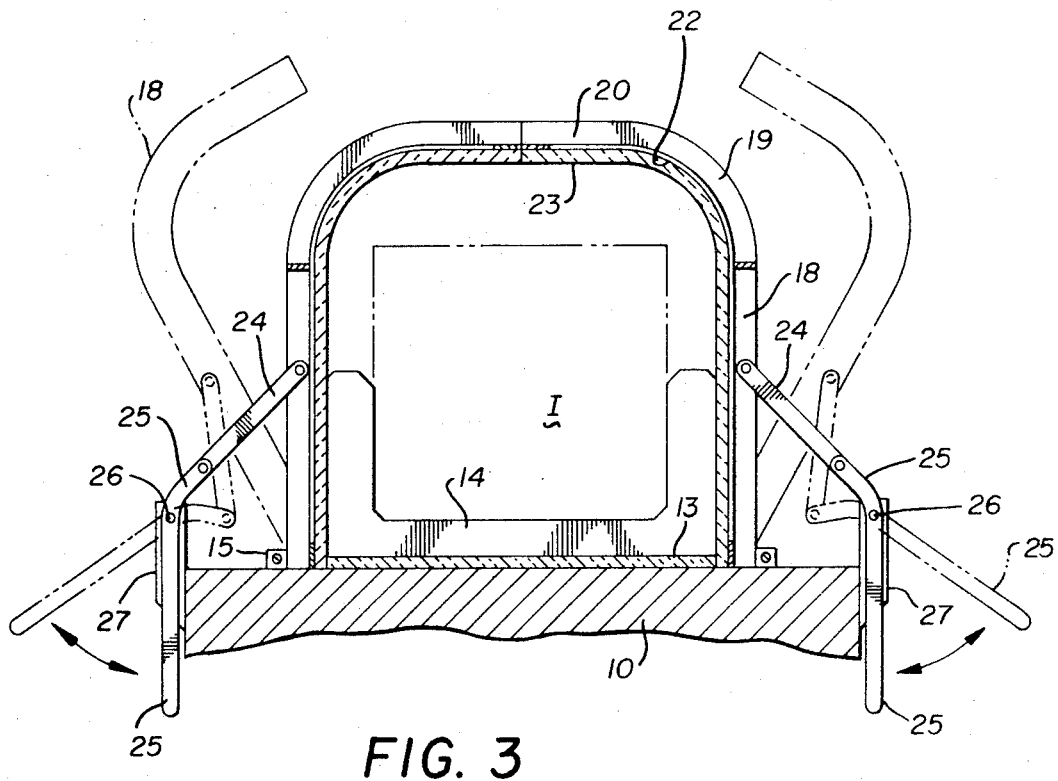
FIG. 3 is a vertical section on line 3—3 of FIG. 1 with broken lines showing the insulated closure sections in opened position.

The deck 10 of the trailer is formed of noncombustable materials and includes a layer of heat insulation preferably covered by reflective insulation and a plurality of cradles 14 positioned thereon and arranged to receive and support a plurality of hot metal ingots (See FIG. 3). A plurality of brackets 15 are mounted on the deck 10 and a longitudinally extending hinge rod 16 is positioned therethrough. Hinge brackets 17 engaged on hinge rod 16 adjacent the brackets 15 are secured to the lower portions of vertically extending frame members 18 the upper portions of which curve inwardly as at 19 and continue horizontally as at 20 to a central vertical line corresponding with the longitudinal axis of the deck 10. Subframe members 21 extend between the vertical and horizontal portions of the frame members 18 and sheet metal panels 22 are secured thereto and serve to carry heat insulation 23 which forms a complete liner for each of the oppositely disposed sidewardly movable insulated cover sections described.

A suitable insulation material for the purpose is an alumina silicate refractory fiber material such as commercially available under the trademark FIBERFRAX or KAO-WOOL. Still referring to FIG. 1 of the drawings it will be seen that the front and the rear end of the trailer are provided with insulated end sections F and R respectively which are preferably removably secured thereto.

Figure 2:
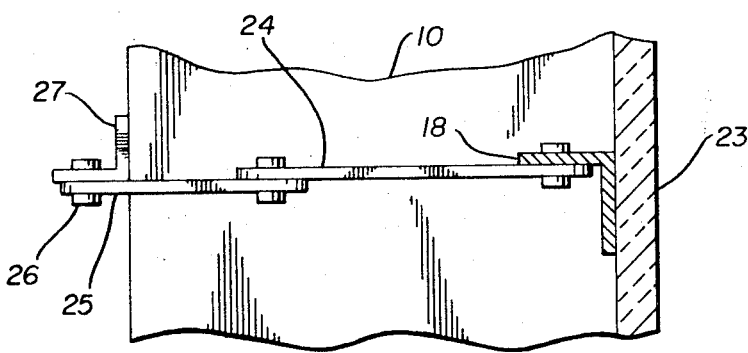
FIG. 2 is an enlarged detail on line 2—2 of FIG. 1 illustrating means for holding the insulated closure sections in closed position.

By referring to FIGS. 2 and 3 of the drawings it will be seen that means have been disclosed for moving the oppositely disposed sidewardly movable insulated cover sections from the closed position seen in FIGS. 1 and 3 of the drawings to the open position seen in broken lines in FIG. 3 of the drawings and that such means comprises a plurality of links 24 pivoted to the frame members 18 and to levers 25 which in turn are pivoted as at 26 to deck extensions 27 on the deck 10. As illustrated in solid lines the links 24 and levers 25 are in overcenter position with the lower ends of the levers 25 positioned adjacent the sides of the deck 10 where they may be held by fasteners not shown if desired. In such position the links 24 and levers 25 hold the frame members 18 and their respective oppositely disposed sidewardly movable insulated cover sections in closed position with respect to the cradles 14 on the deck 10 and any ingots in the cradles. By moving the lower ends of the levers 25 outwardly of the sides of the deck 10 of the trailer the overcenter condition of the links 24 and levers 25 is changed and the resulting leverage applied to the oppositely disposed sidewardly movable insulated cover sections which are thereby moved outwardly and away from one another to the open positions illustrated in broken lines in FIG. 3 of the drawings.

Alternate means for moving the oppositely disposed sidewardly movable insulated cover sections will occur to thos skilled in the art and may for example comprise pneumatic or hydraulic piston and cylinder assemblies positioned between the deck 10 and the respective cover sections for imparting movement thereto.

Those skilled in the art will observe that the oppositely disposed sidewardly movable insulated cover sections while illustrated and described hereinbefore as a pair of units, may actually comprise a plurality of pairs of oppositely disposed units positioned in end to end engagement when closed and capable of being individually moved from closed to open position and back to closed position. In such event each of the oppositely disposed sidewardly movable insulated cover sections has end frame sections which are engagable in closed relation in heat sealing relation.

Those skilled in the art will observe that steel ingots as removed from an ingot mold or a soaking pit are frequently of a temperature approximating 2,100°F. and that if the ingots are to be reduced the temperature must be largely retained by the ingots when they reach the reduction facilities such as a rolling mill. By hauling the ingots in the trailer disclosed herein the heat of the ingots is largely retained as the entire device is constructed to prevent loss of heat of the ingots. At the same time the structure of the trailer vehicle and the cover sections etc., are protected by the insulation from the high temperatures involved. It will occur to those skilled in the art that the arrangement of the oppositely disposed sidewardly movable insulated cover sections is such that they engage one another along their top edges when in closed or covering relation so as to prevent air leakage through the same which would otherwise cool the ingots being transported.

The above described structure provides relatively easy and fast loading of hot ingots and their rapid covering and permits economical and efficient truck transport of the ingots from their place of formation to a rolling mill or other facility which may therefore be located at some distance from the point of origin.

Although but one embodiment of the present invention has been illustrated and described, it will be apparent to those skilled in the art that various changes and modifications may be made therein without deparing from the spirit of the invention.

I claim:

1. A vehicle for transporting hot ingots, comprising a supporting structure having ground engaging wheels, a plurality of cradles on said supporting structure for supporting said hot ingots, a plurality of pairs of oppositely disposed, individually actuated, outwardly pivotally movable cover sections hinged to said supporting structure along opposite sides thereof, and means connected with the cover sections in each pair to move the cover sections of one pair between open and closed positions independently of movement of an adjacent pair, adjacent pairs of cover sections having means thereon to effect a heat seal therebetween when in closed position.

2. The vehicle for transporting hot ingots as set forth in claim 1 and wherein the cover sections are insulated, and forward and rearward insulated wall sections closing the ends of the cover sections.

3. The vehicle for transporting hot ingots set forth in claim 2 and wherein the cover sections are insulated with alumina silicate fiber insulation and said insulation is arranged to protect said cover sections from the heat of said hot ingots.

4. The vehicle for transporting hot ingots set forth in claim 2 and wherein actuating means is positioned on said supporting structure in spaced relation to said oppositely disposed sidewardly movable insulated cover sections and engaged therewith for imparting movement thereto toward and away from one another.

5. The vehicle for transporting hot ingots set forth in claim 4 and wherein said actuating means comprises a plurality of links and levers pivoted to one another and to said supporting structure and to said oppositely disposed sidewardly movable cover sections, and wherein the points of connection of said links and levers are positioned to move into an overcenter locking relation between said cover sections and said supporting structure for holding said cover sections in a closed position and supporting said cover sections in an open position.

6. The vehicle for transporting hot ingots as set forth in claim 5 and wherein said links and levers include a link pivotally connected at one end to each said cover section and pivotally connected at the other end to one end of a lever, said lever pivotally connected at a point spaced from said one end to said supporting structure and including a handle means to manually operate said actuating means.

7. The vehicle for transporting hot ingots as set forth in claim 6, wherein said link is pivotally connected at said one end to said cover section between top and bottom edges of the cover section, said lever being arcuate shaped and pivotally connected between its ends to said supporting structure, with the opposite ends of the lever extending from said point of connection at an angle to one another, the other end of the lever comprising said handle means.

* * * * *